(12) United States Patent
Johnsen et al.

(10) Patent No.: US 12,264,532 B2
(45) Date of Patent: Apr. 1, 2025

(54) INSULATED GLASS UNIT WITH INFRARED REFLECTING PIGMENTATION IN THE MASK

(71) Applicant: VKR HOLDING A/S, Hørsholm (DK)

(72) Inventors: Simon Johnsen, Hørsholm (DK); Patrick Vandereecken, Hørsholm (DK)

(73) Assignee: VKR HOLDING A/S, Hørsholm (DK)

( * ) Notice: Subject to any disclaimer, the term of this patent is extended or adjusted under 35 U.S.C. 154(b) by 247 days.

(21) Appl. No.: 17/922,615

(22) PCT Filed: May 4, 2021

(86) PCT No.: PCT/EP2021/061675
§ 371 (c)(1),
(2) Date: Nov. 1, 2022

(87) PCT Pub. No.: WO2021/224228
PCT Pub. Date: Nov. 11, 2021

(65) Prior Publication Data
US 2023/0212906 A1    Jul. 6, 2023

(30) Foreign Application Priority Data

May 6, 2020  (DK) .............................. PA202070294

(51) Int. Cl.
*E06B 3/67* (2006.01)
*B32B 17/06* (2006.01)
(Continued)

(52) U.S. Cl.
CPC ............ *E06B 3/6715* (2013.01); *B32B 17/06* (2013.01); *C03C 17/3644* (2013.01);
(Continued)

(58) Field of Classification Search
CPC .. E06B 3/7615; E06B 3/6621; E06B 3/66352; E06B 3/66361; E06B 3/66366;
(Continued)

(56) References Cited

U.S. PATENT DOCUMENTS 3,667,179 A * 6/1972 Eisenberg ............... E06B 3/302
    52/309.3
5,512,341 A * 4/1996 Newby ............... E06B 3/66314
    428/35.8
(Continued)

FOREIGN PATENT DOCUMENTS

DE    7247104    6/1973
DE    3240639 A1    5/1984
(Continued)

OTHER PUBLICATIONS

International Search Report for corresponding application PCT/EP2021/061675 filed May 4, 2021; Mail date Aug. 17, 2021.
(Continued)

*Primary Examiner* — Kyle J. Walraed-Sullivan
(74) *Attorney, Agent, or Firm* — CANTOR COLBURN LLP

(57) ABSTRACT

The invention relates to a roof or skylight window comprising a frame and an insulated glazing unit, where the insulated glazing unit comprises a first glass pane (10) and a second glass pane (20) each having inner surfaces (11, 21) opposing each other, and a side seal (4) arranged between the first glass pane (10) and the second glass pane (20) creating a sealed cavity (40) between the glass panes (10, 20). The first glass pane (10) comprises an edge surface region (14) overlapping the side seal (4) along at least a first part of the side seal (4), wherein the edge surface region (14) comprises an enamel layer (16) comprising pigments reflecting near infrared light.

19 Claims, 6 Drawing Sheets

(51) Int. Cl.
*C03C 17/36* (2006.01)
*C03C 27/10* (2006.01)
*E04D 13/03* (2006.01)
*E06B 3/66* (2006.01)
*E06B 3/663* (2006.01)
*E06B 9/24* (2006.01)

(52) U.S. Cl.
CPC .......... *C03C 17/366* (2013.01); *C03C 27/10* (2013.01); *E04D 13/033* (2013.01); *E06B 3/6621* (2013.01); *E06B 3/66352* (2013.01); *E06B 3/66361* (2013.01); *E06B 3/66366* (2013.01); *E06B 9/24* (2013.01); *B32B 2255/20* (2013.01); *B32B 2307/412* (2013.01); *B32B 2311/08* (2013.01); *B32B 2315/08* (2013.01); *B32B 2419/00* (2013.01); *E06B 3/6617* (2013.01)

(58) Field of Classification Search
CPC ........ E06B 3/6617; E06B 3/2632; E06B 9/24; E06B 2003/26323; E06B 2003/26334; E06B 2003/6638; E06B 3/66304; E06B 3/66309; E06B 3/66342; E04D 3/06; E04D 13/033
See application file for complete search history.

(56) References Cited

U.S. PATENT DOCUMENTS

| | | | | |
|---|---|---|---|---|
| 2001/0023560 | A1* | 9/2001 | Degelsegger | B32B 17/069 52/204.593 |
| 2008/0256896 | A1* | 10/2008 | Lisec | E06B 3/56 52/786.1 |
| 2009/0139163 | A1* | 6/2009 | Prete | E06B 3/66366 52/204.593 |
| 2014/0335329 | A1* | 11/2014 | Abayasinghe | C09D 127/06 427/160 |
| 2017/0028686 | A1* | 2/2017 | Wilson | B32B 7/05 |
| 2017/0139109 | A1* | 5/2017 | Gierens | B32B 17/10055 |
| 2017/0170776 | A1* | 6/2017 | Janowski | H02S 20/26 |
| 2018/0038154 | A1* | 2/2018 | Vianello | E06B 3/67365 |
| 2018/0170013 | A1* | 6/2018 | Hubert | E06B 9/24 |
| 2018/0224689 | A1* | 8/2018 | DeMiglio | G02F 1/13392 |
| 2018/0259696 | A1 | 9/2018 | Borrelli | |
| 2018/0344053 | A1* | 12/2018 | Schreiber | A47F 3/0434 |
| 2019/0024442 | A1* | 1/2019 | Chorine | E06B 3/025 |
| 2019/0024443 | A1* | 1/2019 | Chorine | E06B 3/67326 |
| 2019/0257144 | A1* | 8/2019 | Van Kampen | E06B 9/24 |
| 2020/0332593 | A1* | 10/2020 | Ribberink | H01L 31/0216 |
| 2020/0369565 | A1* | 11/2020 | Bertin-Mourot | C03C 3/091 |
| 2021/0403375 | A1* | 12/2021 | Schneider | E06B 3/6621 |
| 2022/0010610 | A1* | 1/2022 | McDonald | C03C 27/10 |
| 2022/0024187 | A1* | 1/2022 | Zeiss | B60J 3/04 |
| 2022/0042370 | A1* | 2/2022 | Burrows | E06B 3/67 |
| 2022/0242783 | A1* | 8/2022 | Yamamoto | B32B 17/10211 |
| 2022/0298052 | A1* | 9/2022 | Jamart | C03C 27/10 |
| 2023/0050347 | A1* | 2/2023 | Kitzman | E06B 3/66342 |
| 2023/0229033 | A1* | 7/2023 | Stelzer | E06B 9/24 349/36 |
| 2023/0333433 | A1* | 10/2023 | Sarrach | G02F 1/155 |
| 2023/0406761 | A1* | 12/2023 | Veerasamy | C03C 17/3681 |
| 2024/0059048 | A1* | 2/2024 | Flamary-Mespoulie | B32B 17/10229 |
| 2024/0066840 | A1* | 2/2024 | Zhang | E06B 9/24 |

FOREIGN PATENT DOCUMENTS

| | | | |
|---|---|---|---|
| EP | 1528213 | A1 | 5/2005 |
| EP | 33093473 | A1 | 4/2018 |
| EP | 3597601 | A1 | 1/2020 |
| WO | 2009018828 | A1 | 2/2009 |
| WO | 2015080214 | A1 | 6/2015 |
| WO | 2017068368 | A1 | 4/2017 |

OTHER PUBLICATIONS

Written Opinion of the International Searching Authority for corresponding application PCT/EP2021/061675 filed May 4, 2021; Mail date Aug. 17, 2021.

* cited by examiner

INSULATED GLASS UNIT WITH INFRARED REFLECTING PIGMENTATION IN THE MASK

BACKGROUND

Insulated glass (IG) units include two or more glass panes separated by e.g. gas-filled space to reduce heat transfer across a part of the building envelope. At the periphery of the glass panes are a side sealing to provide the closed space between the glass panes. The IG units provide thermal and noise insulating properties.

To hide the side sealing, the side sealing may be covered by a dark mask layer thereby making it appear aesthetically more appealing for the viewer. When exposed to sun light, the mask layer is heated due to the increased absorption of radiation from the sun by the dark colour. In particular, IG units installed in windows exposed to large amounts of sun, e.g. roof top windows, may heat up to a very high temperature around the peripheral side sealing. If blinds are installed in connection with the window, reflection from the blinds may further increase the temperature at the peripheral side sealing due to the blinds reflecting the sun light onto the peripheral side sealing.

The increased temperatures may weaken the side seal and result in small fractures into the before closed space between the glass panes, which in turn reduces the thermal and noise insulating properties.

SUMMARY

Disclosed herein is an insulated glazing (IG) unit comprising:
- a first glass pane and a second glass pane each having inner surfaces opposing each other, and
- a side seal arranged between the first glass pane and the second glass pane creating a sealed cavity between the glass panes;

wherein the first glass pane comprises an edge surface region overlapping the side seal along at least a first part of the side seal, wherein the edge surface region comprises an enamel layer comprising pigments, wherein the pigments reflect at least 40% of solar radiation in a near infrared wavelength range between 700-2500 nm.

By edge surface region is included a region close to or at the peripheral edge of the glass pane. The edge region also includes a region starting at a smaller distance from the peripheral edge of the glass pane. Such distance could be up to 10 cm or more depending on the size of the IG unit and also on the frame into which the IG unit is meant to be mounted.

By including pigment reflecting large parts of the near infrared solar radiation, the temperature in the edge surface region with the side seal is reduced. If the space between the glass panes are filled with a gas, the drop in temperature reduces leakage of the gas inside the IG unit. The reduction of temperature around the side seal also serves to prevent moisture ingress inside the IG unit. The thermal gas pressure in IGU may also be lowered with lower temperature. Sealant used for sealing the cavity between the glass panes may degraded over long periods of use when exposed to sunlight/heat. This degradation is reduced when implementing the near infrared reflecting pigments in the enamel layer for reducing the temperature in particularly around the side sealing.

Also disclosed herein is a roof or skylight window comprising a frame and an insulated glazing unit according to the above.

For IG units exposed to direct solar radiation of 900 W/m² (direct solar radiation as defined in ASTM G-173), experiments have shown that the temperature may easily be reduced by 10 degrees Celsius when including the near infrared reflecting pigments in the enamel layer as compared to when omitting the near infrared reflecting pigments. Thus, in one or more examples, the insulated glazing unit may have a periphery temperature at the edge surfaces region, wherein the pigments reduces the periphery temperature by at least 10 degrees when the insulated glazing unit is exposed to direct solar radiation of 900 W/m².

The enamel layer may be positioned on the inner surface of the first glass pane. When the IG unit is used in a window unit with the first glass pane positioned as the outermost glass pane directly exposed to sun light radiation, the enamel layer reflect the near infrared radiation from the sun greatly reducing the amount of near infrared radiation coming into contact with the side seal.

The second glass pane may also comprise an enamel layer. Thus, the second glass pane may comprise an edge surface region overlapping the side seal along at least a second part of the side seal, wherein the edge surface region comprises an enamel layer, wherein the enamel layer is positioned on the inner surface of the second glass pane.

In addition or as an alternative, the enamel layer(s) may be positioned on one or both of the outer surface(s) of the glass pane(s). This further reduces the amount of near infrared sun light penetrating through the glass pane an into the side seal.

In one or more examples, the pigments reflects at least 50% of solar radiation in the near infrared wavelength range between 700-2500 nm, such as at least 60%, such as at least 70%, such as at least 80%. The larger the reflection is, the more the temperature is lowered. This prolongs the lifetime of the IG unit. For example, the pigments may reflect between 50-80% of incoming solar radiation in the near infrared wavelength range between 700-2500 nm.

In order to still maintain a dark/black enamel layer providing the aesthetically appealing design, the pigments may reflect less than 20%, such as less than 15%, such as less than 10%, of the light in a visible/ultraviolet wavelength range between 300-700 nm.

In one or more examples, the enamel layer comprises the pigments in a weight concentration of between 5-30 weight %, such as between 10-25 weight %, such as between 10-20 weight %, such as between 10-15 weight %. The weight percent will normally depend on the reflectance spectrum of the pigments. The pigments may be dispersed in a glass matrix. Depending on the glass matrix, the weight concentration of the pigments may also vary. The rendering of the color in the enamel also depends on both the choice of pigment, and also of the wetting of the pigment by the glass matrix.

In one or more examples, the pigments are metal and metal oxides comprising one or more of the metals selected from the list of:
Aluminum
Antimony
Bismuth
Cobalt
Copper
Chrome
Iron
Manganese Nickel
Titanium
Vanadium
Zinc
Zirconium.

In one or more examples, the pigments are selected from the list of:
  $TiO_2$ (titanium dioxide)
  ZnO (zinc oxide)
  $ZrO_2$ (zirconium oxide)
  $Sb_2O_3$(Antimony(III)oxide)
  $BiVO_4$ (Bismuth vanadate)
  $(Ti,Cr,Sb)O_2$ (Chrome antimony titanium buff rutile)
  $(Cr,Fe)_2O_3$(Chrome Iron Brown Hematite)
  $Cr_2O_3$(Chrome green)
  $Cr_2O_3+Fe_2O_3$ (chrome green+black hematite)
  $CoAl_2O_4$ (cobalt aluminate blue spinel)
  $Co(Al, Cr)_2O_4$(Cobalt Chromite Blue-Green Spinel)
  $CoCr_2O_4$ (Cobalt Chromite Green Spinel)
  $Co_2TiO_4$ (Cobalt titanate green spinel)
  $MnFe_2O_4$(Black manganese ferrite)
  $Fe_2TiO_4$ (Iron Titanium Brown Spinel)
  $(Ti,Mn,Sb)O_2$ (brown Manganese Titanate)
  $(Ti,Ni,Sb)O_2$ (Nickel Antimony Titanium Yellow Rutile)
  $Fe_2O_3$(Red iron oxide)
  $ZnFe_2O_4$(Zinc Ferrite Brown Spinel)
  $Co(Fe,Cr)_2O_4$(Cobalt chromium iron spinel)
  $Cr_2O_3+Fe_2O_3$ (chrome green+black hematite)
  $FeCr_2O_4$ (iron chromite black spinel)
  $CuCr_2O_4$ (oxo-(oxochromiooxy)chromium)
  a combination of the above.

In one or more examples, the pigments is a $Cr_2O_3$ and $Fe_2O_3$ mixture or a $CuCr_2O_4$ based mixture.

The enamel layer may further be a pyrolytic coating layer. This may be advantageous for tempered glass and/or low emittance coated glass due to production efficiency.

The glass panes each has a thickness defined by the distance between the first major surface and the second major surface of the glass panes. The thickness of the glass panes may be the same, which allows for usage of the same production lines for producing the glass panes. The thickness of the glass pane may alternatively by different if e.g. coating or similar is used on one of the panes. A thinner glass pane may also be used for one of the glass panes possibly reducing production costs. In one or more examples, at least one of the first glass pane and the second glass pane has a thickness of between 1-6 mm, or between 2-5 mm, or between 3-5 mm, or between 2.5-4.5 mm.

In one or more examples, the insulated glazing unit further comprises a third glass pane positioned between the inner surfaces of the first glass pane and the second glass pane. The third glass pane comprises a first inner surface and a second inner surface. A first cavity part is formed between the first glass pane and the third glass pane, and a second cavity part is formed between the second glass pane and the third glass pane. The third glass pane introduced two cavities, which improves the thermal and noise insulating properties of the IG unit.

The third glass pane may be secured between the first and the second glass panes in different manners. In one or more examples, the third glass pane is secured between the first glass pane and the second glass pane by middle pane spacers positioned adjacent to the side seal.

In one or more examples, the side seal comprises:
  a first side seal arranged between the first glass pane and the third glass pane forming a first cavity part; and
  a second side seal arranged between the second glass pane and the third glass pane forming a second cavity part.

The thickness of the inner third glass plane is often thinner that the outer glass panes. The third glass pane may have a thickness of less than 2 mm, such as less than 1 mm, such as between 0.2-2.0 mm, or between 0.4-1.0 mm, or between 0.5-0.8 mm, or between 0.5-0.7 mm, or 0.6 mm.

In one or more examples, the side seal is arranged peripherally on at least the second glass pane. The enamel layer may also be arranged peripherally on the second glass pane.

The first glass pane and the second glass pane may not have the same dimensions. In one or more examples, the first glass pane is longer and/or wider the second glass pane. The difference in length and/or width may provide an IG unit, where the peripheral edge of the first glass pane is to extending in a stepped overhang manner outside second glass pane and the sealed cavity. When an IG unit is mounted in a window frame, a stepped glass overhang provides the window with an appearance of being an all glass window without a frame. A frame, i.e. a wooden frame, may in this manner be hidden or masked by a stepped overhang glass. The side seal may be arranged at an edge distance (d_edge) from peripheral parts of the first glass panes along one side of the first pane. By edge distance is included as the longitudinal part of the distance from the periphery of the first glass pane to the periphery of the second—and smaller—glass pane.

In one or more examples, the inner surface of at least the first glass pane further comprises a low emittance coating layer. The inner surfaces of the second glass pane and/or the third glass pane may also comprise a low-emittance coating layer. By low-emittance coating layer is included a low-emittance or low-emittance low-E surface coating. Any suitable low-E coating can be used. For example, the inner surfaces of the first and second glass panes can each have the same or different low-emittance coatings.

Low-E coating may comprise several layers, including silver layers. Thus, in one or more examples, the low emittance coating layer comprises a plurality of coating layers. The low emittance coating layer may comprise a silver layer.

Low-E coatings may include a layer of an infrared-reflecting film and one or more optional layers of a transparent dielectric film. The infrared-reflecting film, which may include a conductive metal such as silver, gold, or copper, reduces the transmission of heat through the coated pane. A dielectric film may be used to anti-reflect the infrared-reflecting film and to control other properties and characteristics of the coating, such as color and durability. Commonly used dielectric materials include oxides of zinc, tin, indium, bismuth, and titanium, among others.

Example low-E coatings include one or two silver layers each sandwiched between two layers of a transparent dielectric film. Increasing the number of silver layers may increase the total infrared reflection, although additional silver layers may also reduce the visible transmission through the window and/or negatively impact the coating's color or durability.

In one or more examples, the enamel layer is arranged on the inner surface of the first glass pane at a minimum separation distance (d_sep) of at least 1.5 mm, such as at least 2 mm, or such as at least 3 mm from the low emittance coating layer comprising the silver layer. Normally, an enamel cannot be coated on top of the low emittance coating layer, in particular if the low emittance coating layer contains silver. The low emittance coating layer must therefore be deleted, i.e. removed, to avoid the silver layer chemically reacting with the enamel layer over time. Means to remove the low emittance coating layer is using laser ablation. Mechanical delete tends to leave fragments which when coated with enamel, result in visual gas bubbles, which is normally not preferred.

Alternatively, the low emittance coating layer may be absent of silver. Thereby the low emittance coating layer may comprise the enamel layer.

Any suitable glass from which glass panes can be obtained may be used for the glass panes. Examples include a soda lime silica glass and an alkali aluminosilicate glass. Thus, in one or more examples, at least one of the glass panes are a soda lime silica glass or an alkali aluminosilicate glass. The glass panes are normally substantially transparent to visible light (i.e. at least about 50% transparent, more preferably at least about 70% transparent, more preferably at least about 80% transparent, and most preferably at least about 90% transparent), although they may be tinted in some examples.

In one or more examples, at least one of the glass panes are strengthened glass panes.

In one or more examples, at least one of the glass panes are tempered glass panes. The term "tempered glass pane" as used herein is understood to mean glass panes in which compressive stresses have been introduced in the surface(s) of the glass pane. For glass to be considered strengthened this compressive stress on the surface(s) of the glass can be a minimum of 69 MPa (10,000 psi) and may be higher than 100 MPa. The VIG is heated during production in order to form the periphery seal etc. and some glass strength may be annealed or lost during manufacture.

The glass panes may be strengthened in a number of ways including thermal tempering, a plasma source, an ion source, or chemically strengthened. In one or more examples, the tempered glass panes have been tempered by thermal tempering, chemical tempering, plasma tempering, or a combination comprising at least one of the foregoing. In one or more examples, the tempered glass panes have been strengthened by thermal tempering.

Tempered glass, also known as toughened glass, may be produced from annealed glass by means of a strengthening procedure, which e.g. may be thermal tempering, chemical tempering, or plasma tempering with the purpose of introducing the compressive stresses into the surface(s) of the glass pane. After tempering, the stress developed by the glass can be high, and the mechanical strength of tempered glass can be four to five times greater than that of annealed glass.

The tempered glass panes may have been tempered by thermal tempering. Thermally tempered glass may be produced by means of a furnace in which an annealed glass pane is heated to a temperature of approximately 600-700° C., after which the glass pane is rapidly cooled. The cooling introduces the compressive stresses into the glass pane surface(s).

A chemical tempering process involves chemical ion exchange of at least some of the sodium ions in the glass pane surface with potassium ions by immersion of the glass pane into a bath of liquid potassium salt, such as potassium nitrate. The potassium ions are about 30% larger in size than the replaced sodium ions, which causes the material at the glass pane surfaces to be in a compressed state. In this process, typically by immersion of the glass sheet into a molten salt bath for a predetermined period of time, ions at or near the surface of the glass sheet are exchanged for larger metal ions from the salt bath. The temperature of the molten salt bath is typically about 400-500° C. and the predetermined time period can range from about two to ten hours. The incorporation of the larger ions into the glass strengthens the sheet by creating a compressive stress in a near surface region. A corresponding tensile stress is induced within a central region of the glass to balance the compressive stress.

Plasma tempering of glass panes resembles the chemical tempering process in that sodium ions in the surface layers of the glass pane are replaced with other alkali metal ions so as to induce surface compressive stresses in the glass pane, the replacement is however made by means of plasma containing the replacement ions. Such method may be conducted by using a plasma source and first and second electrodes disposed on opposing major surfaces of a glass pane, wherein the plasma comprises replacement ions, such as potassium, lithium, or magnesium ions, whereby the replacement ions are driven into the opposing surfaces of the glass pane so as to increase the strength of the pane.

In one or more examples, the enamel layer has been applied to the glass pane(s) prior to strengthening the glass pane(s).

In one or more examples, one or more of the glass panes have a break strength of 150 N or greater, such as 300 N or greater, or such as 400 N or greater, as measured with an applied force in a direction substantially perpendicular to a region of the outer surface that is aligned with the spacer contact region of the inner surface.

The sealed cavity between the glass panes may be filled with at least one gas. In one or more examples, the gas is dry air, argon, krypton, xenon, or a mixture thereof.

In one or more examples, the side seal is not adhering to the glass panes directly, but via a sealant material. Thus, the side seal may be adhered to the inner surfaces of the glass panes by a sealant material.

In one or more examples, the sealant material is selected from the group of polyisobutylene, polysulfide, polyurethane, silicone, or mixtures including one or more from the group.

In one or more examples, the enamel layer overlaps the sealant material. This protects the sealant material by reducing the amount of sun light reaching the sealant material.

In one or more examples, the enamel layer extends over a larger area than the sealant material such that the sealant material is covered by the enamel layer. This takes into account that the sun light may illuminate the IG unit at different direction and at different angles.

In one or more examples, the side seal comprises a spacer bar comprising an outer shell with an inner filling material. The inner filling material may be a desiccant material. The desiccant material may be chosen from the group of:
  Aerogel
  Bentonite clay
  Calcium chloride
  Calcium oxide
  Calcium sulfate (Drierite)
  Molecular sieve
  Silica gel The outer shell may be a plastic outer shell or a metal outer shell, such as a steel or aluminium shell. For IG units using a steel or an aluminum spacer one typically use 3 Å zeolites (molecular sieves). In some examples, silica gels are added for improved performance. In thermoplastic spacers, calcium oxide is often used.

The outer shell may comprise openings providing gas access between the sealed cavity and the inner filling material.

In one or more examples, the spacer bar is further secured to and between the glass panes by means of a second sealant material.

As an alternative to a gas filled IG unit, the IG unit may be a vacuum insulated glazing (VIG) unit, where the sealed cavity is nearly if not substantially completely absent of a gas. The sealed cavity normally has a pressure between the two glass panes no higher than 0.001 mbar. The evacuated space may be sealed at a reduced pressure of less than 0.001 millibars in order to ensure an insulating effect of the VIG unit. The pressure in the sealed cavity between the two glass panes may e.g. be no higher than 0.0005 mbar, such as higher than 0.0001 mbar. The overall construction provides improved thermal and noise insulating properties compared to ordinary glass windows. The side sealing at the periphery of the glass sheets accordingly needs to be tight in order to provide that the desired internal pressure in the void can be maintained for several years. To prevent sagging and contact between adjacent glass panes, the support structures e.g. pillars can serve as discrete spacers between adjacent glass panes. Thus, the VIG unit normally comprises a plurality of pillars arranged between the opposed inner surfaces of the first glass pane and the inner surface of the second glass pane.

The pillars may comprise a metal, a ceramic, or a glass. The pillars may have a height of 0.05 to 0.7 mm, or 0.1 to 0.4 mm, or 0.15 to 0.3 mm. There may be a pillar-to-pillar distance between each adjacent pillar is 20 to 120 mm, preferably 25 to 80 mm, more preferably 30 to 60 mm.

In one or more examples, the side seal is a glass side seal material, such as a glass solder frit material. The side seal material may be an amorphous glass solder material. The side seal material may have a low melting glass component, wherein thermal treatment of the side seal material can be used to hermetically seal the periphery of the insulated glazing unit. The solder glass material component may comprise at least one oxide selected from vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or any combinations of one or more thereof. The side seal material may comprise less than 0.1% lead. The enamel layer may cover the side seal.

Also disclosed herein is a roof or skylight window comprising a frame and an insulated glazing unit according to the above. The insulated glazing unit may be adhered to the frame by a frame sealant material.

In one or more examples, the frame sealant material is selected from the group of polysulfide adhesive, polyurethane adhesive, silicone adhesive, silane-terminated polyurethane (SPUR) adhesive, modified-silyl polymer (SMP) adhesive, or butyl adhesive.

In one or more examples, the window is a fixed or ventilating window of a commercial building.

In one or more examples, the window is a fixed or ventilating window of a residential building.

In one or more examples, the frame comprises a sash and a stationary frame part. The IG unit will normally be adhered and mounted in the sash, whereas the stationary frame part will normally be fixedly mounted in the building. Thus, in one or more examples, the insulated glazing unit is adhered to the sash and the window can be opened by moving the sash relative to the stationary frame.

In one or more examples, the insulating unit is mounted in the frame such that the first pane is oriented towards the exterior and the second pane is oriented towards the interior of the commercial building or the residential building.

As mentioned, in one or more examples, the window is for a roof window or a skylight window. These window types are normally exposed to very large amounts of sunlight as a very large portion of the outer surface of the IG unit is turned directly towards the sun.

Alternatively, the window may be for a vertical window application.

In one or more examples, the first pane projects over the frame at least on one side to form a step unit window. This may provide an aesthetically appealing appearance.

In one or more examples, the window further comprises a cover adjacent to the outer side of the second glass pane. The cover may be selected from the group of blinds, rollers, shades, or curtains. This allows a user to block and/or reduce the amounts of sun light penetrating through the window and into the building. However, a cover may also reflect the sun light efficiently onto the e.g. the side seal. Reducing the amount of near infrared radiation penetrating through the first glass pane and onto the side seal may therefore efficiently reduce the amount of near infrared radiation, which can be reflected by the cover.

BRIEF DESCRIPTION OF THE DRAWINGS

Various examples are described hereinafter with reference to the figures. Like reference numerals refer to like elements throughout. Like elements will, thus, not be described in detail with respect to the description of each figure. It should also be noted that the figures are only intended to facilitate the description of the examples.

They are not intended as an exhaustive description of the claimed invention or as a limitation on the scope of the claimed invention. In addition, an illustrated example needs not have all the aspects or advantages shown. An aspect or an advantage described in conjunction with a particular example is not necessarily limited to that example and can be practiced in any other examples even if not so illustrated, or if not so explicitly described.

DESCRIPTION OF EXAMPLES

Figure 1:
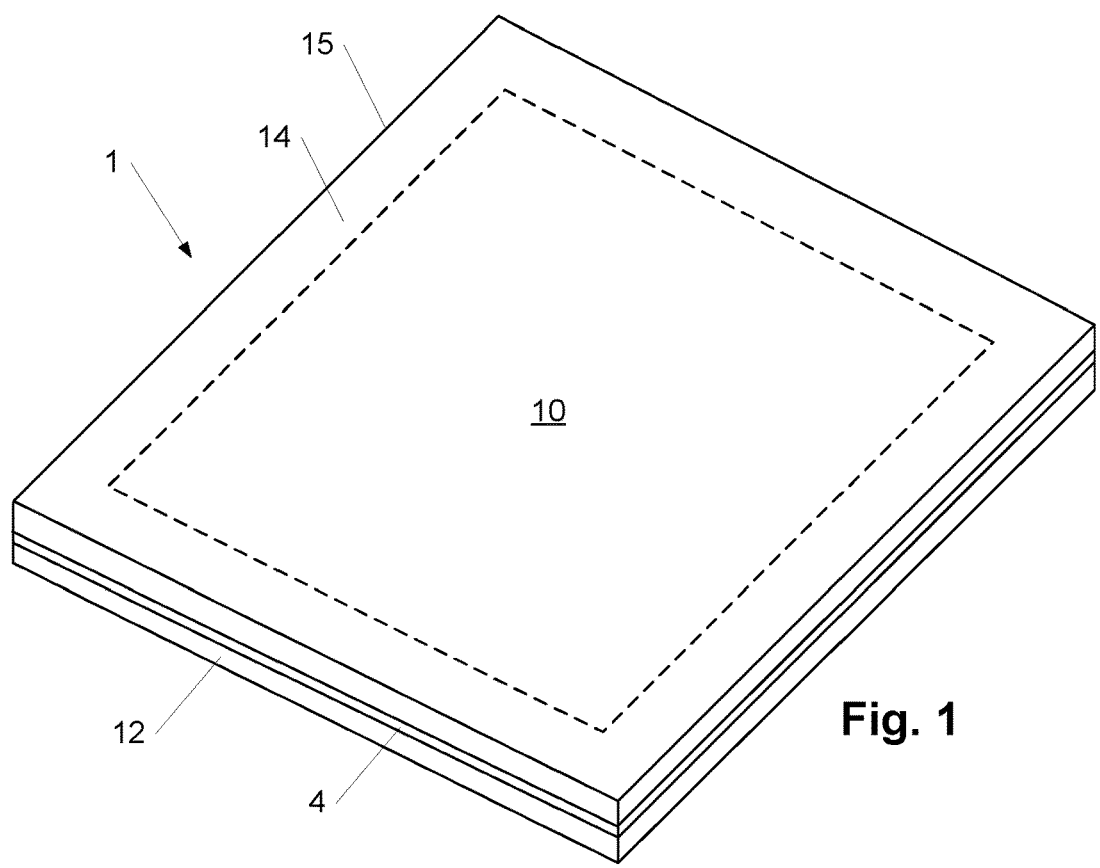
FIG. 1 shows an insulated glazing unit in a top-down perspective view.

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, thicknesses of a plurality of layers and areas are illustrated in an enlarged manner for clarity and ease of description thereof. When a layer, area, element, or plate is referred to as being "on" another layer, area, element, or plate, it may be directly on the other layer, area, element, or plate, or intervening layers, areas, elements, or plates may be present there between. Conversely, when a layer, area, element, or plate is referred to as being "directly on" another layer, area, element, or plate, there are no intervening layers, areas, elements, or plates there between. Further when a layer, area, element, or plate is referred to as being "below" another layer, area, element, or plate, it may be directly below the other layer, area, element, or plate, or intervening layers, areas, elements, or plates may be present there between. Conversely, when a layer, area, element, or plate is referred to as being "directly below" another layer, area, element, or plate, there are no intervening layers, areas, elements, or plates there between.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed there between.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary examples of the present disclosure.

FIG. 1 shows an insulated glazing (IG) unit 1 in a top-down perspective view. The IG unit has a first glass pane 10 with an inner surface 11 and an outer surface 12, and a second glass pane 20 with an inner surface 21 and an outer surface 22. The two inner surfaces 11, 21 are opposing each other as is shown e.g. in FIGS. 2A-B. Between the two glass panes 10, 20 is a side seal 4. The side seal 4 is arranged between the first glass pane 10 and the second glass pane 20 such that a sealed cavity 40 is created between the two glass pane 10, 20. The sealed cavity 40 may be filled with at least one gas such as e.g. dry air, argon, krypton, xenon, or a mixture thereof.

The two glass panes comprises an edge surface region. The edge surface region 14 of the first glass pane 10 is visible in FIG. 1. The edge surface region 14 is a region close to or at the peripheral edge 15 of the glass pane 10. The edge surface region 14 may extend al around the glass pane as shown in FIG. 1. The edge region 14 may also start at a smaller distance from the peripheral edge 15 of the glass pane 10. Such distance could be up to 10 cm or more depending on the size of the IG unit and also on the frame into which the IG unit may be meant to be mounted.

Figure 2A:
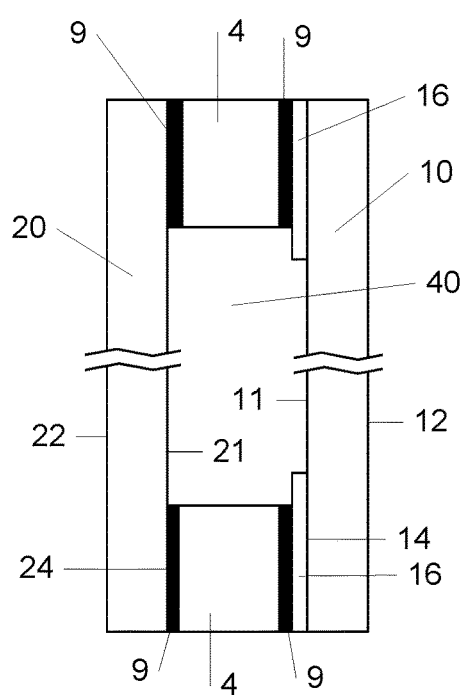
FIGS. 2A-B show cut-through views of two examples of insulated glazing units.
Figure 2B:
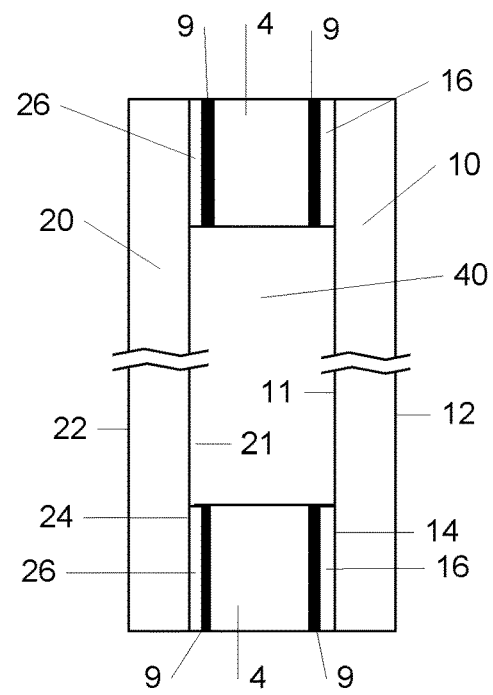

As shown in the IG units in FIGS. 2A-B, the edge region 14 is overlapping the side seal 4. On/in the edge surface region 14 is found an enamel layer 16. As shown in FIG. 2A, the enamel layer 16 can be positioned on the inner surface 11 of the first glass pane 10. As shown in FIG. 2B, an enamel layer 26 may also be present on/in the inner surface 21 of the second glass pane 20 in an edge surface region 24 also overlapping the side seal 4. One or both of the outer surfaces 12, 22 of the glass panes 10, 20 may also comprise an enamel layer. As shown in FIGS. 2A-B, the enamel layer 16, 26 may be arranged peripherally on the glass panes. The enamel layer on the first and second glass panes 10, 20 may be the same type of enamel. Different enamel layers may also be used for the each of the two glass panes 10, 20.

Figure 3:
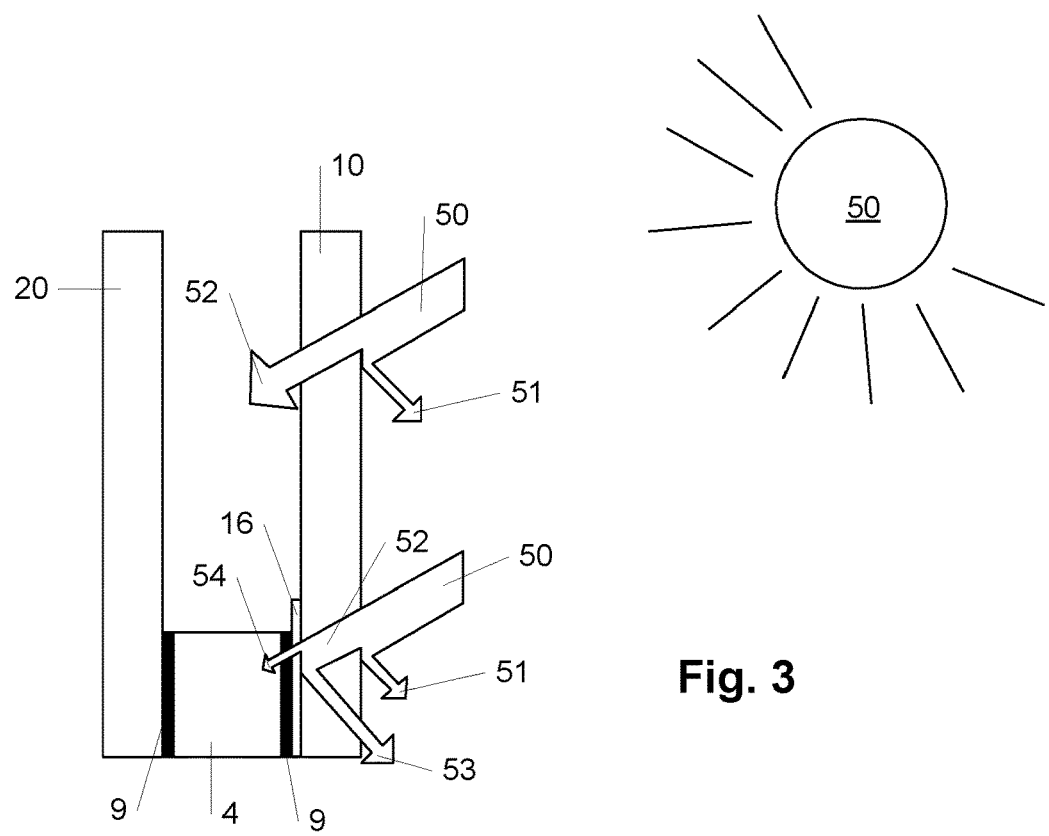
FIG. 3 illustrates how radiation from the sun is transmitted through and reflected of the outer surface of the first glass pane and the enamel layer.

The enamel layer(s) 16, 26 comprise pigments, which reflect at least 40% of solar radiation in a near infrared wavelength range between 700-2500 nm. This is illustrated in FIG. 3 showing how radiation from the sun 50 is transmitted through and reflected of the outer surface 12 of the first glass pane 10 and the enamel layer 16. The sun light reflected from the outer surface 12 of the first glass pane 10 is marked as 51, and the sun light passing through the outer surface 12 of the first glass pane 10 is marked as 52. At the portions of the first glass pane 10, where an enamel layer 16 is found on the inner surface 11 of the first glass pane 10, a portion of the sun light transmitted 52 through the first glass pane 10 is reflected from the enamel layer 16, as marked with arrow 53. Only a portion of sun light passes through the enamel layer 16 as marked by arrow 54. The enamel layer 16 therefore efficiently reflects an additional portion of the incoming sub light 50.

The pigments in the enamel layer 16 are particles, which are normally dispersed in a glass matrix. The rendering of the color in the enamel depends on both the pigment, but also of the wetting of the pigment by the glass matrix.

The presence of the pigments in the enamel layer 16 may reduce the temperature at the edge surface region 14 by at least 10 degrees for some pigments when the IG unit is exposed to direct solar radiation of 900 W/m$^2$.

Figure 4:
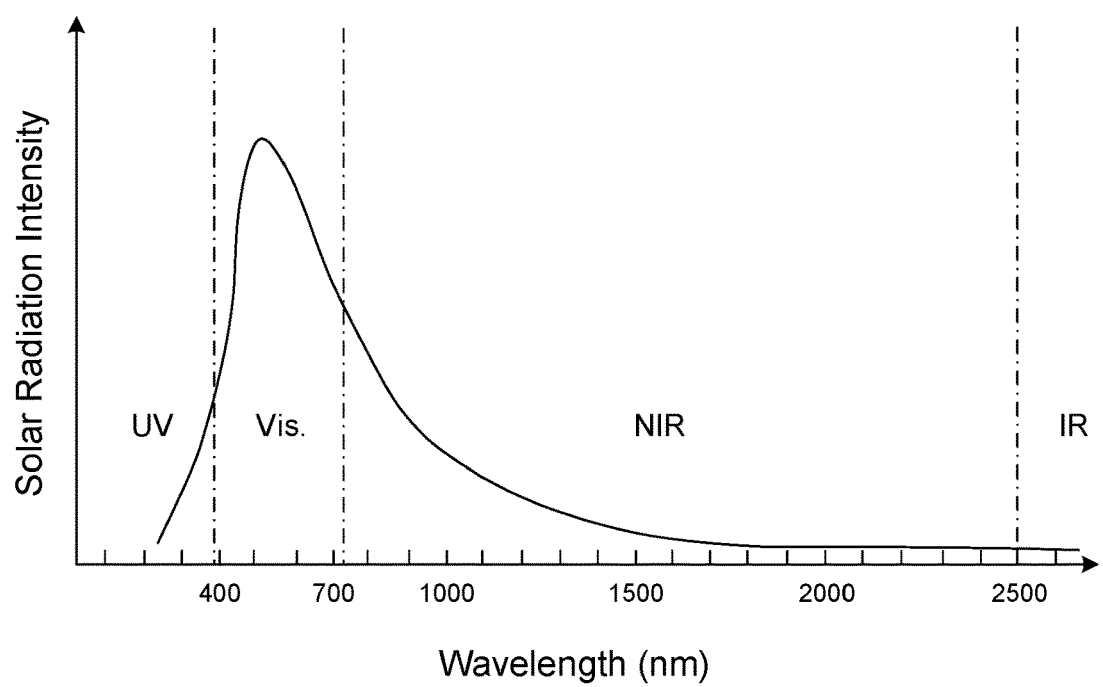
FIG. 4 is a rough illustration of the spectral distribution of the sun light radiation.

In FIG. 4, a rough illustration of the spectral distribution of the sun light radiation are shown. The visible (vis) wavelength range from approximately 380 nm to 740 nm is flanged by the ultraviolet (UV) wavelength range and the near infrared (NIR) wavelength range, the latter again bordering to the infrared (IR) wavelength range around approximately 2500 nm. As seen in FIG. 4, the majority of the sun light is visible light, but still a significant portion of approximately 30-40% of the sun light originates from radiation in the NIR wavelength range.

Figure 5:
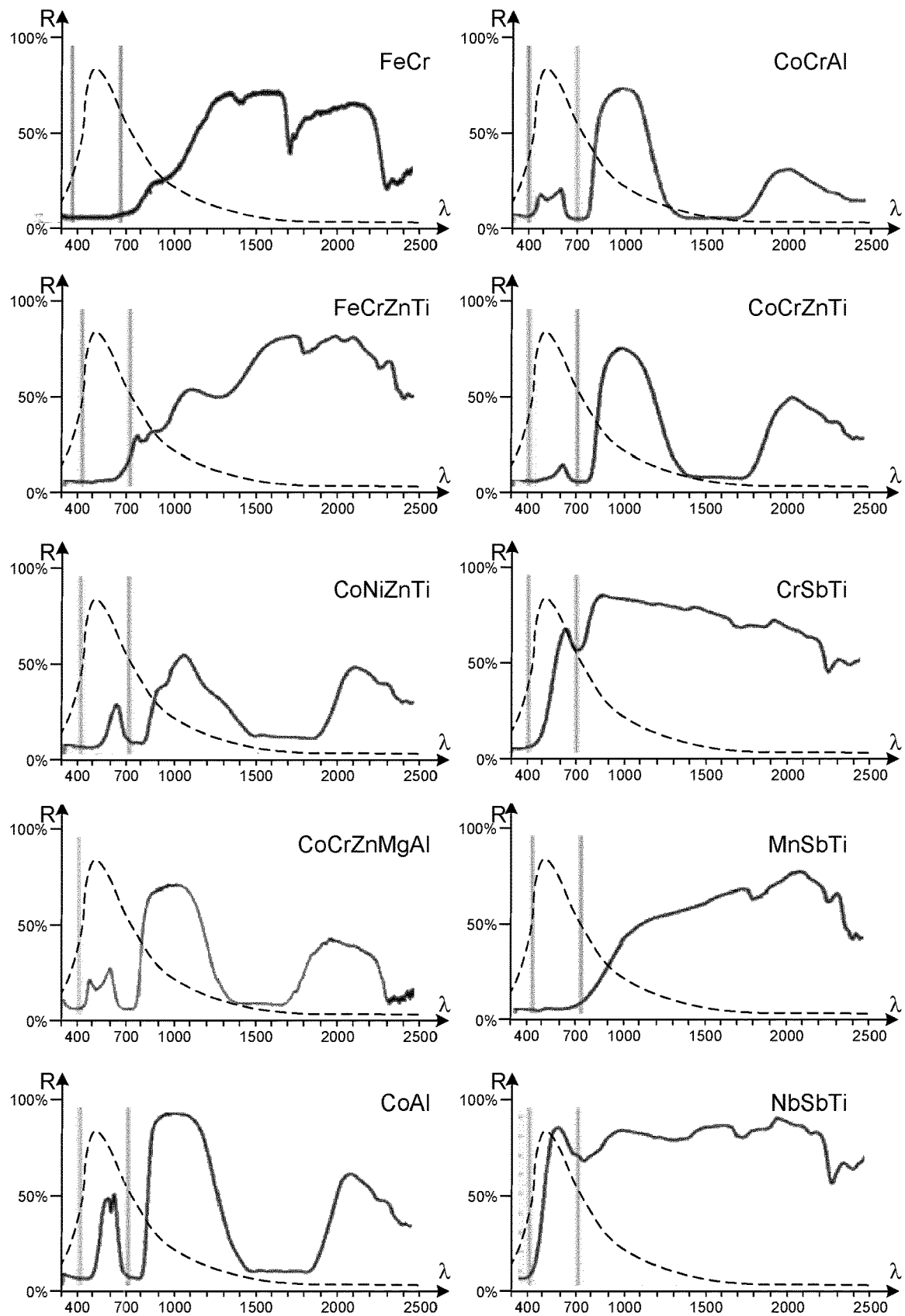
FIG. 5 shows the reflectance spectra of different metal oxides pigments.

In FIG. 5, the reflectance spectra of different examples of metal oxide pigments are shown (solid line). The dotted line is the solar radiation spectrum of FIG. 4, and the vertical lines are approximate markings of the visible spectrum region. As can be seen, the choice of metal combinations shown for each spectrum in FIG. 5 results in different reflectance profiles. In one or more examples, the pigments reflects at least 50% of solar radiation in the NIR wavelength range between 700-2500 nm. In some examples, at least 60%, such as at least 70%, such as at least 80% of the NIR light may be reflected by the pigments. In one or more examples, the pigments reflects between 50-80% of solar radiation in the near infrared wavelength range between 700-2500 nm.

As seen in FIG. 5, some of the pigments, e.g. the FeCr, CoCrZnTi, and MnSbTi oxides to name a few, reflect less than 20%, such as less than 15%, such as less than 10%, of the light in a visible/ultraviolet wavelength range between 300-700 nm. A large portion of the light at these wavelengths will be absorbed by the pigments. The absorption of the visible sun light make the pigments appear dark if not black. The pigments are normally metal and metal oxides comprising one or more of the metals selected from the list of; Aluminum, Antimony, Bismuth, Cobalt, Copper, Chrome, Iron, Manganese, Nickel, Titanium, Vanadium, Zinc, and Zirconium.

As shown in FIG. 5, a number of different combinations of metals may constitute each pigment type. For example, the pigments may be selected from the list of; $TiO_2$ (titanium dioxide), ZnO (zinc oxide), $ZrO_2$ (zirconium oxide), $Sb_2O_3$ (Antimony(III)oxide), $BiVO_4$ (Bismuth vanadate), $(Ti,Cr,Sb)O_2$ (Chrome antimony titanium buff rutile), $(Cr,Fe)_2O_3$ (Chrome Iron Brown Hematite), $Cr_2O_3$(Chrome green), $Cr_2O_3+Fe_2O_3$ (chrome green+black hematite), $CoAl_2O_4$ (cobalt aluminate blue spinel), $Co(Al, Cr)_2O_4$(Cobalt Chromite Blue-Green Spinel), $CoCr_2O_4$(Cobalt Chromite Green Spinel), $Co_2TiO_4$ (Cobalt titanate green spinel), $MnFe_2O_4$ (Black manganese ferrite), $Fe_2TiO_4$ (Iron Titanium Brown Spinel), $(Ti,Mn,Sb)O_2$ (brown Manganese Titanate), $(Ti,Ni,Sb)O_2$ (Nickel Antimony Titanium Yellow Rutile), $Fe_2O_3$ (Red iron oxide), $ZnFe_2O_4$(Zinc Ferrite Brown Spinel), $Co(Fe,Cr)_2O_4$(Cobalt chromium iron spinel), $Cr_2O_3+Fe_2O_3$ (chrome green+black hematite), $FeCr_2O_4$ (iron chromite black spinel), $CuCr_2O_4$ (oxo-(oxochromiooxy)chromium), or a combination thereof.

In one or more examples, the enamel layer comprises the pigments in a weight concentration of between 5-30 weight %, such as between 10-25 weight %, such as between 10-20 weight %, such as between 10-15 weight %. As stated above, the weight percent will depend on the glass matrix in which the particles are dispersed and/or of the wetting of the pigment by the glass matrix.

Additionally, the enamel layer may also be a pyrolytic coating layer.

Figure 6A:
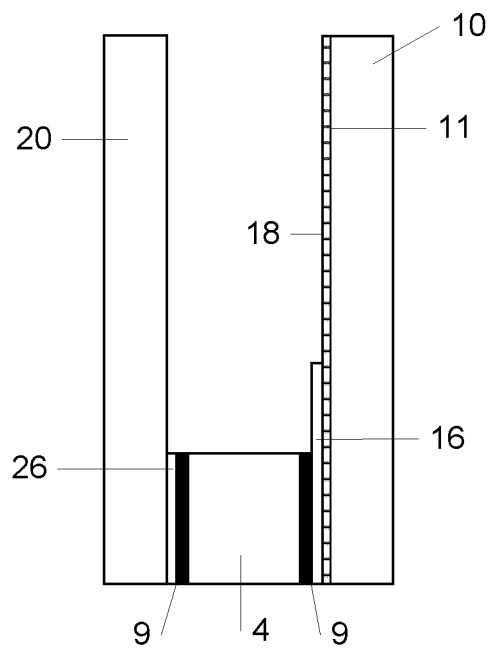
FIGS. 6A-B show cut-through views of insulated glazing units with a low emittance coating layer.

The inner surface of at least the first glass pane 10 may further comprise a low emittance coating layer 18. The is shown in FIG. 6A, where a low emittance coating layer 18 is positioned on the inner surface 11 of the first glass pane 10 between the glass pane 10 and the enamel layer 16. The enamel layer 16 may be coated on top of the low emittance coating layer 18, when the latter is absent of silver. The low emittance coating layer 18 is shown as a separate layer in FIG. 6A for illustrative purposes. The enamel layer 16 may also be an integrated part of the low emittance coating layer 18.

FIG. 6A shows a layer of low emittance coating 18 and a layer of enamel 16 on the inner surface 11 of the first glass pane. However, the inner surface 21 of the second glass pane 20 may also comprise a low-emittance coating layer 18 possibly in addition to an enamel layer 16.

The low emittance coating layer 18 may comprise a plurality of coating layers. One or more of these coating layers may be a silver layer. When silver is present in the low emittance layer, the enamel cannot be coated directly on top of the low emittance layer as this may introduce a chemical reaction between the two layers causing a damage to the layers. To avoid this, the low emittance layer must be removed at the location where the enamel layer is to be positioned. One manner of removing part of the low emittance layer is by means of laser ablation. Mechanical deletion is also an option, but tends to leave fragments which when coated with enamel, may result in visual gas bubbles.

Figure 6B:
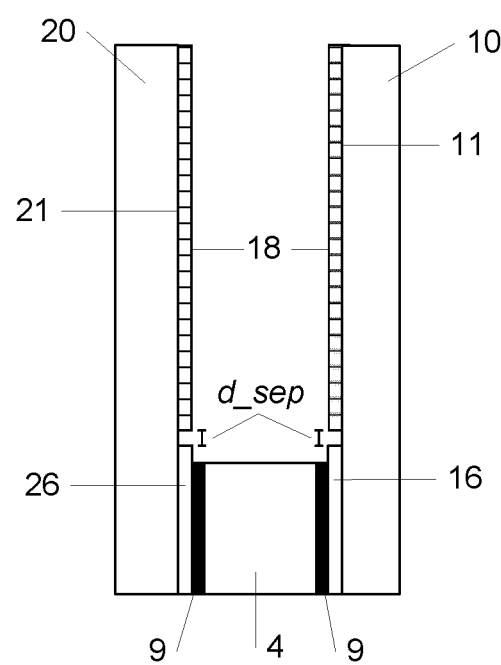

The enamel layer 16 in FIG. 6B is arranged on the inner surface 11 of the first glass pane 10 at a separation distance d_sep from the low emittance coating layer 18 on both panes 10, 20. The separation distance d_sep may be at least 1.5 mm, such as at least 2 mm, or such as at least 3 mm.

Figure 7A:
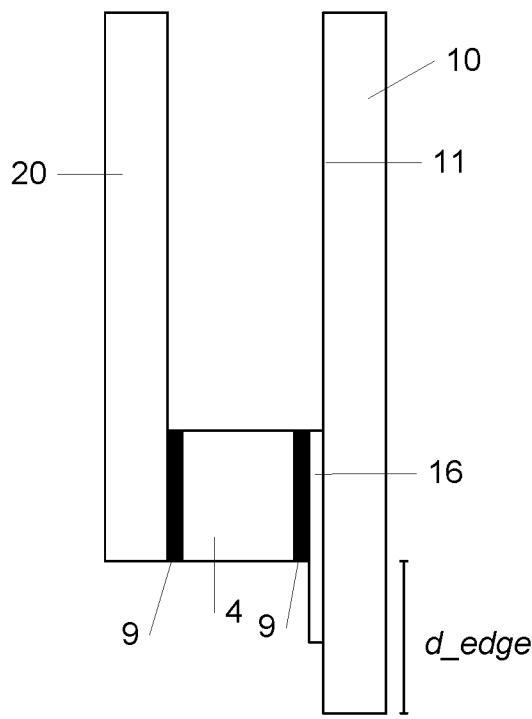
FIGS. 7A-B show cut-through views of insulated glazing units with a low emittance coating layer, where the first glass pane is longer and/or wider the second glass pane.
Figure 7B:
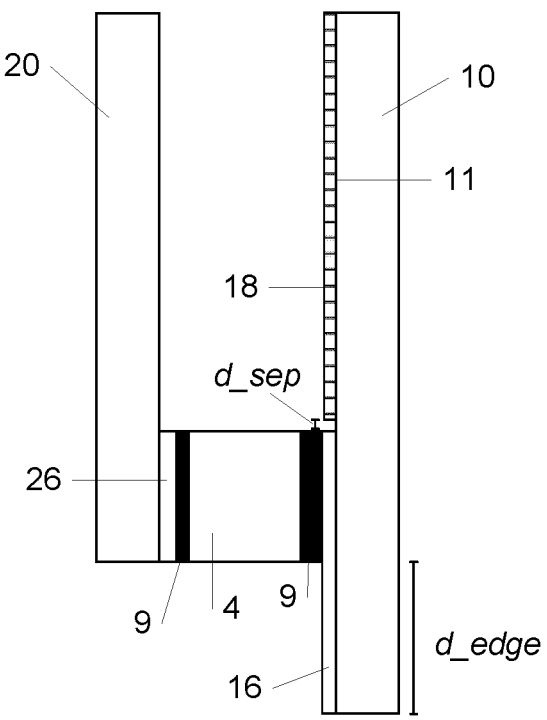

In FIGS. 7A-B are shown examples of IU unit, where the first glass pane 10 is longer and/or wider the second glass pane 20. As can be seen in the figures, the side seal 4 is arranged on the inner surface 11 of the first glass pane 10 at an edge distance d_edge from peripheral parts, i.e. the periphery of the glass pane along at least one side of the first pane 10. In such example, the first glass pane 10 and the second glass pane 20 have different dimensions. The difference in length and/or width may provide an IG unit, where the peripheral edge 15 of the first glass pane 10 is to extending in a stepped overhang manner outside second glass pane 20 and the sealed cavity 40. When an IG unit, where the first glass pane extends outside the second glass pane on all sides, is mounted in a window frame, the stepped glass overhang may provide the window with an appearance of being an all glass window without a frame. A frame, i.e. a wooden frame, may in this manner be hidden or masked by a stepped overhang glass. As seen in FIGS. 7A-B, the edge distance d_edge can be the same as the longitudinal part of the distance from the periphery of the first glass pane 15 to the periphery of the second—and smaller—glass pane.

To illustrate that the different embodiments of IG unit may be combined arbitrarily, the IG unit in FIG. 7B is also shown with a low emittance coating layer 18. Also, the enamel layer 16 in FIG. 7A does not extend all the way to cover all of the hanging step part of the first glass pane.

Figure 8:
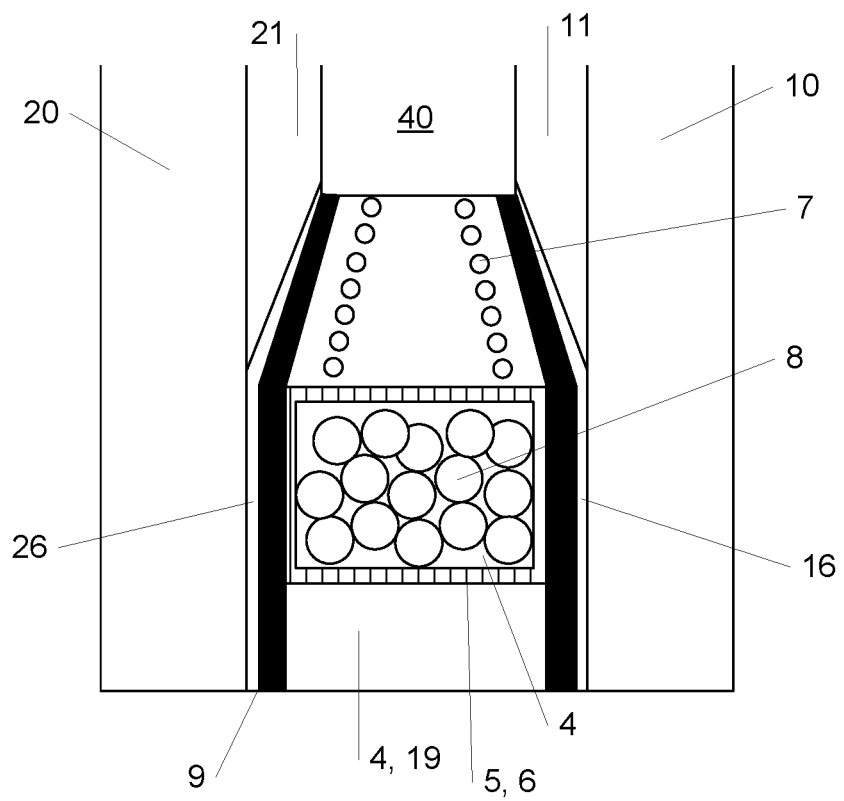
FIG. 8 shows a cut-through view of an insulated glazing unit with a side seal comprising a spacer bar.

The side seal 4 may be adhered to the inner surfaces 11, 21 of the glass panes 10, 20 by a sealant material 9 as illustrated in FIG. 8. In FIG. 8, the IG unit comprises an enamel layer 16, 26 on both glass panes 10, 20. Alternatively, the enamel layer 26 on the second glass pane 20 may be omitted.

The enamel layer 16 may overlap the sealant material 9. The enamel layer 16 may also extend over a larger area than the sealant material 9 such that the sealant material 9 is covered by the enamel layer 16. This illustrated in FIG. 8.

The sealant material 9 may be selected from the group of polyisobutylene, polysulfide, polyurethane, silicone, or mixtures including one or more from the group.

The side seal 4 may comprise a spacer bar 5 comprising an outer shell 6 with an inner filling material 8. The spacer bar 5 may be further secured to and between the glass panes 10, 20 by means of a second sealant material 19. This is also shown in FIG. 8.

The outer shell 6 may be a plastic outer shell or a metal outer shell, such as a steel or aluminium shell. The outer shell may comprise openings 7 providing gas access between the sealed cavity 40 and the inner filling material 8. The inner filling material 8 may be a desiccant material, e.g. a desiccant material chosen from the group of; Aerogel, Bentonite clay, Calcium chloride, Calcium oxide, Calcium sulfate (Drierite), Molecular sieve, and Silica gel.

Figure 9A:
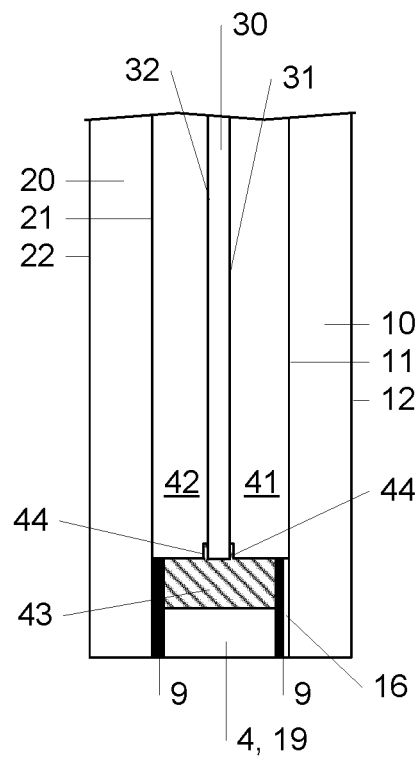
FIGS. 9A-C show cut-through views of insulated glazing units comprising a middle glass pane.
Figure 9B:
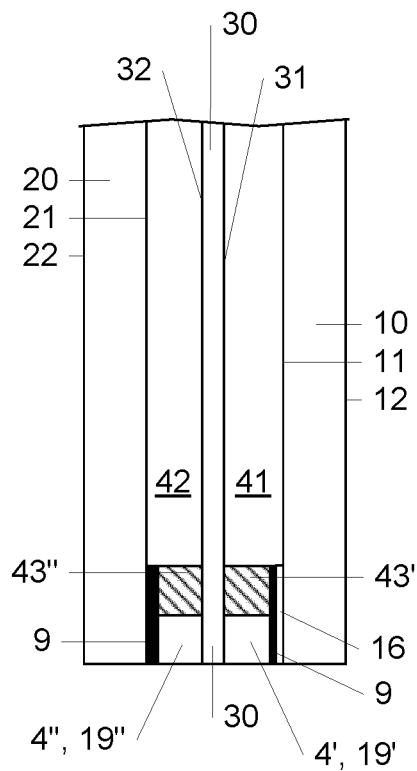
Figure 9C:
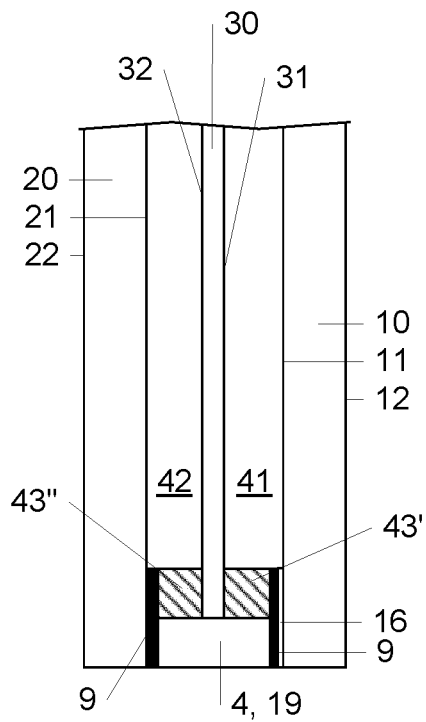

As shown in FIGS. 9A-C, the IG unit may additionally comprise a third glass pane 30 positioned between the inner surfaces 11, 21 of the first glass pane 10 and the second glass pane 20. The third glass pane 30 comprises a first inner surface 31 and a second inner surface 32. A first cavity part 41 is formed between the first glass pane 10 and the third glass pane 30, and a second cavity part 42 is formed between the second glass pane 20 and the third glass pane 30. The inner surfaces 31, 32 of the third glass pane 30 may comprise a low-emittance coating layer and/or an enamel coating layer.

In FIGS. 9A and 9C, the third glass pane 30 has a smaller length and width than that of the first glass pane 10 and the second glass pane 20. In FIG. 9B, where the third glass pane 30 has the same dimension as the first and second glass panes 10, 20.

Depending on the size of the third glass pane 30, it can be secured inside the IG unit between the first and second glass panes 10, 20 in different manners. Often, the third glass pane 30 secured between the first glass pane 10 and the second glass pane 20 by means of middle pane spacers 43, 43', 43" positioned adjacent to the side seal 4, 4', 4". Sealant material 19, 19',19" may be used to secure or as part of the side seal 4, 4', 4".

A spacer 43 comprising a small protruding edge 44 secures the third glass pane 30 inside the IG unit in FIG. 9A. As an alternative to the spacer, a side seal material with sealing properties may also be used directly. Also, a side seal as shown and described in connection with FIG. 8 could also be used.

In FIG. 9B, the side seal 4 comprises a first side seal 4' arranged between the first glass pane 10 and the third glass pane 30 forming a first cavity part 41, and a second side seal 4" arranged between the second glass pane 20 and the third glass pane 30 forming a second cavity part 42. In FIG. 9B, spacers 43', 43" are also shown to assist securing the third glass pane 30 inside the IG unit. Depending on the side seal material, the spacers 43', 43" may be omitted and the third pane 30 held by the side seal 4', 4". The side seal 4, 4', 4" may be a sealant material 19, 19', 19". Two side seals similar to the one shown and described in FIG. 8, possibly in combination with a sealant material, could also be imagined.

In FIG. 9C, the third glass pane 30 is secured in the IG unit by two spacers 43', 43" and a side seal 4, e.g. including a sealant material 19. The side seal may be similar to that shown and described in FIG. 8 in combination with a sealant material could also be imagined.

In one or more examples, the side seal 4, 4" is arranged peripherally on at least the second glass pane.

The glass panes 10, 20, 30 may have different thickness or the same thickness. In one or more examples, at least one of the first glass pane 10 and the second glass pane 20 has a thickness of between 1-6 mm, or between 2-5 mm, or between 3-5 mm, or between 2.5-4.5 mm. In one or more examples, the third glass pane has a thickness of less than 2 mm, such as less than 1 mm, such as between 0.2-2.0 mm, or between 0.4-1.0 mm, or between 0.5-0.8 mm, or between 0.5-0.7 mm, or 0.6 mm.

In one or more examples, at least one of the glass panes 10, 20, 30 are a soda lime silica glass or an alkali aluminosilicate glass. At least one of the glass panes 10, 20, 30 may further be strengthened glass panes. The at least one glass pane may be strengthened by thermal tempering, a plasma source, an ion source, or chemically strengthened. Often, the tempered glass pane(s) have been strengthened by thermal tempering.

The enamel layer 16 may be applied to the first glass pane 10 (and the second glass pane 20 if an enamel layer 26 is applied thereto) prior to strengthening the glass pane(s) 10, 20.

One or more of the glass panes 10, 20, 30 may have a break strength of 150 N or greater, such as 300 N or greater, or such as 400 N or greater, as measured with an applied force in a direction substantially perpendicular to a region of the outer surface that is aligned with the spacer contact region of the inner surface.

As an alternative to a convention IG unit with a gas filled cavity, the insulated glazing unit may be a vacuum insulated glazing (VIG) unit. A VIG unit further comprises a plurality of pillars arranged between the opposed inner surfaces of the first glass pane and the inner surface of the second glass pane. The sealed cavity normally has a pressure between the two glass panes no higher than 0.001 mbar, such as no higher than 0.0005 mbar. The pillars may comprise a metal, a ceramic, a polymer or a glass. The pillars may have a height of 0.05 to 0.7 mm, or 0.1 to 0.4 mm, or 0.15 to 0.3 mm. There may be a pillar-to-pillar distance between each adjacent pillar is 10 to 120 mm, preferably 25 to 80 mm, more preferably 30 to 60 mm. In a VIG unit, the side seal is often a glass side seal material, such as a glass solder frit material, but other seal materials such as an organic seal may be possible. An enamel layer may cover the side seal. In a VIG unit, the side seal material may be an amorphous glass solder material. The side seal material may have a low melting glass component, wherein thermal treatment of the side seal material can be used to hermetically seal the periphery of the insulated glazing unit. The solder glass material component may comprise at least one oxide selected from vanadium oxide, barium oxide, zinc oxide, bismuth oxide, aluminum oxide, silicon oxide, magnesium oxide, chromium oxide, iron oxide, cobalt oxide, sodium oxide, manganese oxide, tantalum oxide, molybdenum oxide, niobium oxide, tellurium oxide, or any combinations of one or more thereof. The side seal material may comprise less than 0.1% lead.

The invention is further described in the following items.
1. An insulated glazing unit (1) comprising:
   a first glass pane (10) and a second glass pane (20) each having inner surfaces (11, 21) opposing each other, and
   a side seal (4) arranged between the first glass pane (10) and the second glass pane (20) creating a sealed cavity (40) between the glass panes (10, 20);
   wherein the first glass pane (10) comprises an edge surface region (14) overlapping the side seal (4) along at least a first part of the side seal (4), wherein the edge surface region (14) comprises an enamel layer (16) comprising pigments, wherein the pigments reflect at least 40% of solar radiation in a near infrared wavelength range between 700-2500 nm.
2. The insulated glazing unit according to any preceding item, wherein the insulated glazing unit has a periphery temperature at the edge surfaces region, wherein the pigments reduces the periphery temperature by at least 10 degrees when the insulated glazing unit is exposed to direct solar radiation of 900 W/m$^2$.
3. The insulated glazing unit according to any preceding item, wherein the enamel layer (16) is positioned on the inner surface (11) of the first glass pane (10).
4. The insulated glazing unit according to any preceding item, wherein the second glass pane (20) comprises an edge surface region (24) overlapping the side seal (4) along at least a second part of the side seal (4), wherein the edge surface region (24) comprises an enamel layer (26), wherein the enamel layer (16) is positioned on the inner surface (21) of the second glass pane (20).
5. The insulated glazing unit according to any preceding item, wherein the pigments reflects at least 50% of solar radiation in the near infrared wavelength range between 700-2500 nm, such as at least 60%, such as at least 70%, such as at least 80%.
6. The insulated glazing unit according to any preceding item, wherein the pigments reflects between 50-80% of solar radiation in the near infrared wavelength range between 700-2500 nm.
7. The insulated glazing unit according to any preceding item, wherein the pigments reflect less than 20%, such as less than 15%, such as less than 10%, of the light in a visible/ultraviolet wavelength range between 300-700 nm.
8. The insulated glazing unit according to any preceding item, wherein the pigments are metal and metal oxides comprising one or more of the metals selected from the list of:
   Aluminum
   Antimony
   Bismuth
   Cobalt
   Copper
   Chrome
   Iron
   Manganese
   Nickel
   Titanium
   Vanadium
   Zinc
   Zirconium.
9. The insulated glazing unit according to any preceding item, wherein the pigments are selected from the list of:
   $TiO_2$ (titanium dioxide)
   ZnO (zinc oxide)
   $ZrO_2$ (zirconium oxide)
   $Sb_2O_3$(Antimony(III)oxide)
   $BiVO_4$ (Bismuth vanadate)
   $(Ti,Cr,Sb)O_2$ (Chrome antimony titanium buff rutile)
   $(Cr,Fe)_2O_3$(Chrome Iron Brown Hematite)
   $Cr_2O_3$(Chrome green)
   $Cr_2O_3+Fe_2O_3$ (chrome green+black hematite)
   $CoAl_2O_4$ (cobalt aluminate blue spinel)
   $Co(Al, Cr)_2O_4$(Cobalt Chromite Blue-Green Spinel)
   $CoCr_2O_4$(Cobalt Chromite Green Spinel)
   $Co_2TiO_4$ (Cobalt titanate green spinel)
   $MnFe_2O_4$(Black manganese ferrite)
   $Fe_2TiO_4$ (Iron Titanium Brown Spinel)
   $(Ti,Mn,Sb)O_2$ (brown Manganese Titanate)
   $(Ti,Ni,Sb)O_2$ (Nickel Antimony Titanium Yellow Rutile)
   $Fe_2O_3$(Red iron oxide)
   $ZnFe_2O_4$(Zinc Ferrite Brown Spinel)
   $Co(Fe,Cr)_2O_4$(Cobalt chromium iron spinel)
   $Cr_2O_3+Fe_2O_3$ (chrome green+black hematite)
   $FeCr_2O_4$ (iron chromite black spinel)
   $CuCr_2O_4$ (oxo-(oxochromiooxy)chromium)
   a combination of the above.
10. The insulated glazing unit according to any preceding item, wherein the pigments is a $Cr_2O_3$ and $Fe_2O_3$ mixture or a $CuCr_2O_4$ based mixture.
11. The insulated glazing unit according to any preceding item, wherein the enamel layer is a pyrolytic coating layer.
12. The insulated glazing unit according to any preceding item, wherein the enamel layer comprises the pigments in a weight concentration of between 5-30 weight %, such as between 10-25 weight %, such as between 10-20 weight %, such as between 10-15 weight %.
13. The insulated glazing unit according to any preceding item, wherein at least one of the first glass pane (10) and the second glass pane (20) has a thickness of between 1-6 mm, or between 2-5 mm, or between 3-5 mm, or between 2.5-4.5 mm.

14. The insulated glazing unit according to any preceding item further comprising a third glass pane (30) positioned between the inner surfaces (11, 21) of the first glass pane (10) and the second glass pane (20), the third glass pane (30) comprising a first inner surface (31) and a second inner surface (32), wherein a first cavity part (41) is formed between the first glass pane (10) and the third glass pane (30), and a second cavity part (42) is formed between the second glass pane (20) and the third glass pane (30).

15. The insulated glazing unit according to item 14, wherein the third glass pane (30) is secured between the first glass pane (10) and the second glass pane (20) by middle pane spacers (43, 43', 43") positioned adjacent to the side seal (4, 4', 4").

16. The insulated glazing unit according to item 14, wherein the side seal (4) comprises:
    a first side seal (4') arranged between the first glass pane (10) and the third glass pane (30) forming a first cavity part (41); and
    a second side seal (4") arranged between the second glass pane (20) and the third glass pane (30) forming a second cavity part (42).

17. The insulated glazing unit according to any of the items 14-16, wherein the third glass pane has a thickness of less than 2 mm, such as less than 1 mm, such as between 0.2-2.0 mm, or between 0.4-1.0 mm, or between 0.5-0.8 mm, or between 0.5-0.7 mm, or 0.6 mm.

18. The insulated glazing unit according to any preceding item, wherein the side seal (4, 4") is arranged peripherally on at least the second glass pane.

19. The insulated glazing unit according to any preceding item, wherein the enamel layer (26) is arranged peripherally on the second glass pane.

20. The insulated glazing unit according to any preceding item, wherein the first glass pane (10) is longer and/or wider the second glass pane (20), wherein the side seal (4, 4', 4") is arranged at an edge distance (d_edge) from peripheral parts of the first glass panes along one side of the first pane.

21. The insulated glazing unit according to any preceding item, wherein the inner surface of at least the first glass pane further comprises a low emittance coating layer (18).

22. The insulated glazing unit according to item 21, wherein the low emittance coating layer (18) comprises a plurality of coating layers.

23. The insulated glazing unit according to any of the items 21-22, wherein the low emittance coating layer (18) comprises a silver layer.

24. The insulated glazing unit according to item 23, the enamel layer (16) is arranged on the inner surface (11) of the first glass pane (10) at a minimum separation distance (d_sep) of at least 1.5 mm, such as at least 2 mm, or such as at least 3 mm from the low emittance coating layer (18) comprising the silver layer.

25. The insulated glazing unit according to any of the items 21-22, wherein the low emittance coating layer (18) is absent of silver and wherein the low emittance coating layer (18) comprises the enamel layer (16).

26. The insulated glazing unit according to any preceding item, wherein at least one of the glass panes (10, 20, 30) are a soda lime silica glass or an alkali aluminosilicate glass.

27. The insulated glazing unit according to any preceding item, wherein at least one of the glass panes (10, 20, 30) are strengthened glass panes.

28. The insulated glazing unit according to item 27, wherein the glass panes are strengthened by thermal tempering, a plasma source, an ion source, or chemically strengthened.

29. The insulated glazing unit according to any of the items 27-28, wherein the tempered glass panes have been strengthened by thermal tempering.

30. The insulated glazing unit according to any of the items 28-29, wherein the enamel layer (16, 26) has been applied to the glass pane(s) (10, 20) prior to strengthening the glass pane(s) (10, 20).

31. The insulated glazing unit according to any preceding item, wherein one or more of the glass panes (10, 20, 30) have a break strength of 150 N or greater, such as 300 N or greater, or such as 400 N or greater, as measured with an applied force in a direction substantially perpendicular to a region of the outer surface that is aligned with the spacer contact region of the inner surface.

32. The insulated glazing unit according to any preceding item, wherein the sealed cavity (40) is filled with at least one gas.

33. The insulated glazing unit according to item 32, wherein the gas is dry air, argon, krypton, xenon, or a mixture thereof.

34. The insulated glazing unit according to any preceding item, wherein the side seal (4) is adhered to the inner surfaces (11, 21, 31, 32) of the glass panes by a sealant material (9).

35. The insulated glazing unit according to item 34, wherein the sealant material (9) is selected from the group of polyisobutylene, polysulfide, polyurethane, silicone, or mixtures including one or more from the group.

36. The insulated glazing unit according to any of the items 34-35, wherein the enamel layer (16) overlaps the sealant material (9).

37. The insulated glazing unit according to any of the items 34-36, wherein the enamel layer (16) extends over a larger area than the sealant material (9) such that the sealant material (9) is covered by the enamel layer (16).

38. The insulated glazing unit according to any preceding item, wherein the side seal (4, 4', 4") comprises a spacer bar (5) comprising an outer shell (6) with an inner filling material (8).

39. The insulated glazing unit according to item 38, wherein the inner filling material (8) is a desiccant material.

40. The insulated glazing unit according to item 39, wherein the desiccant material is chosen from the group of:
    Aerogel
    Bentonite clay
    Calcium chloride
    Calcium oxide
    Calcium sulfate (Drierite)
    Molecular sieve
    Silica gel 41. The insulated glazing unit according to any of the items 38-40, wherein the outer shell (6) is a plastic outer shell or a metal outer shell, such as a steel or aluminium shell.

42. The insulated glazing unit according to any of the items 38-41, wherein the outer shell comprises openings (7) providing gas access between the sealed cavity (40, 41, 42) and the inner filling material (8).

43. The insulated glazing unit according to any of the items 38-41, wherein the spacer bar (5) is further secured to and between the glass panes (10, 20) by means of a second sealant material (19).

44. The insulated glazing unit according to any of the items 1-31, wherein the insulated glazing unit is a vacuum insulated glazing unit further comprising a plurality of pillars arranged between the opposed inner surfaces of the first glass pane and the inner surface of the second glass pane, and wherein the sealed cavity has a pressure between the two glass panes no higher than 0.001 mbar.
45. The insulated glazing unit according to item 44, wherein the side seal is a glass side seal material, such as a glass solder frit material.
46. The insulated glazing unit according to any of the items 44-46, wherein the enamel layer covers the side seal.
47. A window comprising a frame and an insulated glazing unit according to any of the items 1-46.
48. The window according to item 47, wherein the insulated glazing unit is adhered to the frame by a frame sealant material.
49. The window according to any of the items 47-48, wherein the frame comprises a sash and a stationary frame part.
50. The window according to item 49, wherein the insulated glazing unit is adhered to the sash and wherein the window can be opened by moving the sash relative to the stationary frame.
51. The window according to any of the items 47-50, wherein the frame sealant material is selected from the group of polysulfide adhesive, polyurethane adhesive, silicone adhesive, silane-terminated polyurethane (SPUR) adhesive, modified-silyl polymer (SMP) adhesive, or butyl adhesive.
52. The window according to any of the items 47-51, wherein the window is a fixed or ventilating window of a commercial building.
53. The window according to any of the items 47-51, wherein the window is a fixed or ventilating window of a residential building.
54. The window according to item 52 or 53, wherein the insulating unit is mounted in the frame such that the first pane is oriented towards the exterior and the second pane is oriented towards the interior of the commercial building or the residential building.
55. The window according to any of the items 47-54, wherein the window is for a roof window or a skylight window.
56. The window according to any of the items 47-55, wherein the window is for a vertical window application.
57. The window according to any of the items 47-56, wherein the first pane projects over the frame at least on one side to form a step unit window.
58. The window according to any of the items 47-57, wherein the window further comprises a cover adjacent to the outer side of the second glass pane.
59. The window according to any of the items 47-58, wherein the cover is selected from the group of blinds, rollers, shades, or curtains.
60. An insulated glazing unit (1) comprising:
a first glass pane (10) and a second glass pane (20) each having inner surfaces (11, 21) opposing each other, and
a side seal (4) arranged between the first glass pane (10) and the second glass pane (20) creating a sealed cavity (40) between the glass panes (10, 20);
wherein the first glass pane (10) comprises an edge surface region (14) overlapping the side seal (4) along at least a first part of the side seal (4), wherein the edge surface region (14) comprises an enamel layer (16) comprising pigments.
61. The insulated glazing unit according to item 60, wherein the insulated glazing unit has a periphery temperature at the edge surfaces region, wherein the pigments reduces the periphery temperature by at least 10 degrees when the insulated glazing unit is exposed to direct solar radiation of 900 W/m$^2$.
62. The insulated glazing unit according to item 60 or 61, wherein the enamel layer (16) is positioned on the inner surface (11) of the first glass pane (10).
63. The insulated glazing unit according to any of item 60 to 62, wherein the second glass pane (20) comprises an edge surface region (24) overlapping the side seal (4) along at least a second part of the side seal (4), wherein the edge surface region (24) comprises an enamel layer (26), wherein the enamel layer (16) is positioned on the inner surface (21) of the second glass pane (20).
64. The insulated glazing unit according to any of item 60 to 63, wherein the pigments reflects at least 40% of solar radiation in the near infrared wavelength range between 700-2500 nm, such as at least 50%, such as at least 60%, such as at least 70%, such as at least 80%.
65. The insulated glazing unit according to any of item 60 to 64, wherein the pigments reflects between 50-80% of solar radiation in the near infrared wavelength range between 700-2500 nm.
66. The insulated glazing unit according to any of item 65, wherein the pigments reflect less than 20%, such as less than 15%, such as less than 10%, of the light in a visible/ultraviolet wavelength range between 300-700 nm.
67. The insulated glazing unit according to any of item 60-66, wherein the pigments are metal and metal oxides comprising one or more of the metals selected from the list of:
Aluminum
Antimony
Bismuth
Cobalt
Copper
Chrome
Iron
Manganese
Nickel
Titanium
Vanadium
Zinc
Zirconium.
68. The insulated glazing unit according to any of item 60-67, wherein the pigments are selected from the list of:
$TiO_2$ (titanium dioxide)
ZnO (zinc oxide)
$ZrO_2$ (zirconium oxide)
$Sb_2O_3$(Antimony(III)oxide)
$BiVO_4$ (Bismuth vanadate)
$(Ti,Cr,Sb)O_2$ (Chrome antimony titanium buff rutile)
$(Cr,Fe)_2O_3$(Chrome Iron Brown Hematite)
$Cr_2O_3$ (Chrome green)
$Cr_2O_3+Fe_2O_3$ (chrome green+black hematite)
$CoAl_2O_4$ (cobalt aluminate blue spinel)
$Co(Al, Cr)_2O_4$(Cobalt Chromite Blue-Green Spinel)
$CoCr_2O_4$(Cobalt Chromite Green Spinel)
$Co_2TiO_4$ (Cobalt titanate green spinel)
$MnFe_2O_4$(Black manganese ferrite)
$Fe_2TiO_4$ (Iron Titanium Brown Spinel)
$(Ti,Mn,Sb)O_2$ (brown Manganese Titanate)
$(Ti,Ni,Sb)O_2$ (Nickel Antimony Titanium Yellow Rutile)
$Fe_2O_3$(Red iron oxide)

ZnFe$_2$O$_4$(Zinc Ferrite Brown Spinel)
Co(Fe,Cr)$_2$O$_4$(Cobalt chromium iron spinel)
Cr$_2$O$_3$+Fe$_2$O$_3$ (chrome green+black hematite)
FeCr$_2$O$_4$ (iron chromite black spinel)
CuCr$_2$O$_4$ (oxo-(oxochromiooxy)chromium)
a combination of the above.

69. The insulated glazing unit according to any of item 60-68, wherein the pigments is a Cr$_2$O$_3$ and Fe$_2$O$_3$ mixture or a CuCr$_2$O$_4$ based mixture.

70. The insulated glazing unit according to any preceding item, wherein the enamel layer is a pyrolytic coating layer.

71. The insulated glazing unit according to any of item 60-70, wherein the enamel layer comprises the pigments in a weight concentration of between 5-30 weight %, such as between 10-25 weight %, such as between 10-20 weight %, such as between 10-15 weight %.

72. The insulated glazing unit according to any of item 60-71, wherein at least one of the first glass pane (10) and the second glass pane (20) has a thickness of between 1-6 mm, or between 2-5 mm, or between 3-5 mm, or between 2.5-4.5 mm.

73. The insulated glazing unit according to any of item 60-72, further comprising a third glass pane (30) positioned between the inner surfaces (11, 21) of the first glass pane (10) and the second glass pane (20), the third glass pane (30) comprising a first inner surface (31) and a second inner surface (32), wherein a first cavity part (41) is formed between the first glass pane (10) and the third glass pane (30), and a second cavity part (42) is formed between the second glass pane (20) and the third glass pane (30).

74. The insulated glazing unit according to item 73, wherein the third glass pane (30) is secured between the first glass pane (10) and the second glass pane (20) by middle pane spacers (43, 43', 43") positioned adjacent to the side seal (4, 4', 4").

75. The insulated glazing unit according to item 73, wherein the side seal (4) comprises:
a first side seal (4') arranged between the first glass pane (10) and the third glass pane (30) forming a first cavity part (41); and
a second side seal (4") arranged between the second glass pane (20) and the third glass pane (30) forming a second cavity part (42).

76. The insulated glazing unit according to any of the items 73-75, wherein the third glass pane has a thickness of less than 2 mm, such as less than 1 mm, such as between 0.2-2.0 mm, or between 0.4-1.0 mm, or between 0.5-0.8 mm, or between 0.5-0.7 mm, or 0.6 mm.

77. The insulated glazing unit according to any of item 60-76, wherein the side seal (4, 4") is arranged peripherally on at least the second glass pane.

78. The insulated glazing unit according to any of item 60-77, wherein the enamel layer (26) is arranged peripherally on the second glass pane.

79. The insulated glazing unit according to any of item 60-78, wherein the first glass pane (10) is longer and/or wider the second glass pane (20), wherein the side seal (4, 4', 4") is arranged at an edge distance (d_edge) from peripheral parts of the first glass panes along one side of the first pane.

80. The insulated glazing unit according to any of item 60-79, wherein the inner surface of at least the first glass pane further comprises a low emittance coating layer (18).

81. The insulated glazing unit according to item 80, wherein the low emittance coating layer (18) comprises a plurality of coating layers.

82. The insulated glazing unit according to any of the items 80-81, wherein the low emittance coating layer (18) comprises a silver layer.

83. The insulated glazing unit according to item 82, the enamel layer (16) is arranged on the inner surface (11) of the first glass pane (10) at a minimum separation distance (d_sep) of at least 1.5 mm, such as at least 2 mm, or such as at least 3 mm from the low emittance coating layer (18) comprising the silver layer.

84. The insulated glazing unit according to any of the items 80-81, wherein the low emittance coating layer (18) is absent of silver and wherein the low emittance coating layer (18) comprises the enamel layer (16).

85. The insulated glazing unit according to any of item 60-84, wherein at least one of the glass panes (10, 20, 30) are a soda lime silica glass or an alkali aluminosilicate glass.

86. The insulated glazing unit according to any of item 60-85, wherein at least one of the glass panes (10, 20, 30) are strengthened glass panes.

87. The insulated glazing unit according to item 86, wherein the glass panes are strengthened by thermal tempering, a plasma source, an ion source, or chemically strengthened.

88. The insulated glazing unit according to any of the items 86-87, wherein the tempered glass panes have been strengthened by thermal tempering.

89. The insulated glazing unit according to any of the items 87-88, wherein the enamel layer (16, 26) has been applied to the glass pane(s) (10, 20) prior to strengthening the glass pane(s) (10, 20).

90. The insulated glazing unit according to any of item 60-89, wherein one or more of the glass panes (10, 20, 30) have a break strength of 150 N or greater, such as 300 N or greater, or such as 400 N or greater, as measured with an applied force in a direction substantially perpendicular to a region of the outer surface that is aligned with the spacer contact region of the inner surface.

91. The insulated glazing unit according to any of item 60-90, wherein the sealed cavity (40) is filled with at least one gas.

92. The insulated glazing unit according to item 91, wherein the gas is dry air, argon, krypton, xenon, or a mixture thereof.

93. The insulated glazing unit according to any of item 60-92, wherein the side seal (4) is adhered to the inner surfaces (11, 21, 31, 32) of the glass panes by a sealant material (9).

94. The insulated glazing unit according to item 93, wherein the sealant material (9) is selected from the group of polyisobutylene, polysulfide, polyurethane, silicone, or mixtures including one or more from the group.

95. The insulated glazing unit according to any of the items 93-94, wherein the enamel layer (16) overlaps the sealant material (9).

96. The insulated glazing unit according to any of the items 93-95, wherein the enamel layer (16) extends over a larger area than the sealant material (9) such that the sealant material (9) is covered by the enamel layer (16).

97. The insulated glazing unit according to any of item 60-96, wherein the side seal (4, 4', 4") comprises a spacer bar (5) comprising an outer shell (6) with an inner filling material (8).

98. The insulated glazing unit according to item 97, wherein the inner filling material (8) is a desiccant material.

99. The insulated glazing unit according to item 98, wherein the desiccant material is chosen from the group of:
   Aerogel
   Bentonite clay
   Calcium chloride
   Calcium oxide
   Calcium sulfate (Drierite)
   Molecular sieve
   Silica gel
100. The insulated glazing unit according to any of the items 97-99, wherein the outer shell (6) is a plastic outer shell or a metal outer shell, such as a steel or aluminium shell.
101. The insulated glazing unit according to any of the items 97-100, wherein the outer shell comprises openings (7) providing gas access between the sealed cavity (40, 41, 42) and the inner filling material (8).
102. The insulated glazing unit according to any of the items 97-100, wherein the spacer bar (5) is further secured to and between the glass panes (10, 20) by means of a second sealant material (19).
103. The insulated glazing unit according to any of the items 60-90, wherein the insulated glazing unit is a vacuum insulated glazing unit further comprising a plurality of pillars arranged between the opposed inner surfaces of the first glass pane and the inner surface of the second glass pane, and wherein the sealed cavity has a pressure between the two glass panes no higher than 0.001 mbar.
104. The insulated glazing unit according to item 103, wherein the side seal is a glass side seal material, such as a glass solder frit material.
105. The insulated glazing unit according to any of the items 102-103, wherein the enamel layer covers the side seal.
106. A window comprising a frame and an insulated glazing unit according to any of the items 60-105.
107. The window according to item 106, wherein the insulated glazing unit is adhered to the frame by a frame sealant material.
108. The window according to any of the items 106-107, wherein the frame comprises a sash and a stationary frame part.
109. The window according to item 108, wherein the insulated glazing unit is adhered to the sash and wherein the window can be opened by moving the sash relative to the stationary frame.
110. The window according to any of the items 107-109, wherein the frame sealant material is selected from the group of polysulfide adhesive, polyurethane adhesive, silicone adhesive, silane-terminated polyurethane (SPUR) adhesive, modified-silyl polymer (SMP) adhesive, or butyl adhesive.
111. The window according to any of the items 106-110, wherein the window is for a roof window or a skylight window.

REFERENCES 1 insulated glazing unit
4, 4', 4" side seal
5 spacer bar
6 outer shell
7 opening in the outer shell
8 inner filling material
9 sealant material
10 first glass pane
11 inner surface of the first glass pane
12 outer surface of the first glass pane
14 edge surface region of the first glass pane
15 peripheral edge of the first glass pane
16 enamel layer
18 low-E coating layer
19, 19', 19" second sealant material
20 second glass pane
21 inner surface of the second glass pane
22 outer surface of the second glass pane
24 edge surface region of the second glass pane
26 enamel layer
30 third glass pane
31 first inner surface of the third glass pane
32 second inner surface of the third glass pane
40 cavity between the first glass pane and the second glass pane
41 first cavity part between the first glass pane and the third glass pane
42 second cavity part between the second glass pane and the third glass pane
43, 43', 43" middle pane spacer
44 protruding edge on the spacer
50 sun/incoming sun light
51 sun light reflected by the outer surface of the pane
52 sun light transmitted through the outer surface of the pane
53 sun light reflected by the enamel layer
54 sun light transmitted through the enamel layer
d_edge edge distance
d_sep separation distance

The invention claimed is:

1. A roof or skylight window comprising a frame and an insulated glazing unit, wherein the insulated glazing unit comprises:
   a first glass pane and a second glass pane each having inner surfaces opposing each other, and
   a side seal arranged between the first glass pane and the second glass pane creating a sealed cavity between the first and second glass panes;
   wherein the first glass pane comprises an edge surface region overlapping the side seal along at least a first part of the side seal, wherein the edge surface region is a region close- to or at a peripheral edge of the first glass pane, wherein the edge surface region comprises an enamel layer comprising pigments wherein the pigments are metal and metal oxides comprising one or more of the metals selected from the list of: Aluminum; Antimony; Bismuth; Cobalt; Copper; Chrome; Iron; Manganese; Nickel; Titanium; Vanadium; Zinc; Zirconium;
   wherein the pigments reflect at least 40% of solar radiation in a near infrared wavelength range between 700-2500 nm; and
   wherein the insulated glazing unit has a periphery temperature at the edge surface region, wherein the pigments reduces the periphery temperature by at least 10 degrees when the insulated glazing unit is exposed to direct solar radiation of 900W/m$^2$.

2. The roof or skylight window according to claim 1, wherein the second glass pane comprises an edge surface region overlapping the side seal along at least a second part of the side seal, and wherein the enamel layer is positioned:
   on the inner surface of the first glass pane; or
   on the inner surface of both the first glass pane and the second glass pane.

3. The roof or skylight window according to claim 1, wherein the pigments reflects at least 50% of solar radiation in the near infrared wavelength range between 700-2500 nm.

4. The roof or skylight window according to claim 1, wherein the pigments reflects between 50-80% of solar radiation in the near infrared wavelength range between 700-2500 nm.

5. The roof or skylight window according to claim 1, wherein the pigments reflect less than 20% of the light in a visible/ultraviolet wavelength range between 300-700 nm.

6. The roof or skylight window according to claim 1, wherein the enamel layer comprises the pigments in a weight concentration of between 5-30 weight %.

7. The roof or skylight window according to claim 1, wherein the pigments are selected from the list of:
$TiO_2$ (titanium dioxide)
ZnO (zinc oxide)
$ZrO_2$ (zirconium oxide)
$Sb_2O_3$(Antimony(III)oxide)
$BiVO_4$ (Bismuth vanadate)
$(Ti,Cr,Sb)O_2$ (Chrome antimony titanium buff rutile)
$(Cr,Fe)_2O_3$(Chrome Iron Brown Hematite)
$Cr_2O_3$(Chrome green)
$Cr_2O_3+Fe_2O_3$ (chrome green+black hematite)
$CoAl_2O_4$ (cobalt aluminate blue spinel)
$Co(Al, Cr)_2O_4$(Cobalt Chromite Blue-Green Spinel)
$CoCr_2O_4$(Cobalt Chromite Green Spinel)
$Co_2TiO_4$ (Cobalt titanate green spinel)
$MnFe_2O_4$ (Black manganese ferrite)
$Fe_2TiO_4$ (Iron Titanium Brown Spinel)
$(Ti,Mn,Sb)O_2$ (brown Manganese Titanate)
$(Ti,Ni,Sb)O_2$ (Nickel Antimony Titanium Yellow Rutile)
$Fe_2O_3$ (Red iron oxide)
$ZnFe_2O_4$ (Zinc Ferrite Brown Spinel)
$Co(Fe,Cr)_2O_4$(Cobalt chromium iron spinel)
$Cr_2O_3+Fe_2O_3$ (chrome green+black hematite)
$FeCr_2O_4$ (iron chromite black spinel)
$CuCr_2O_4$ (oxo-(oxochromiooxy)chromium)
a combination of the above.

8. The roof or skylight window according to claim 1, wherein the pigments is a $Cr_2O_3$ and $Fe_2O_{mixture}$ or a $CuCr_2O_4$ based mixture.

9. The roof or skylight window according to claim 1, wherein the enamel layer is a pyrolytic coating layer.

10. The roof or skylight window according to claim 1 further comprising a third glass pane positioned between the inner surfaces of the first glass pane and the second glass pane, the third glass pane comprising a first inner surface and a second inner surface, wherein a first cavity part is formed between the first glass pane and the third glass pane, and a second cavity part is formed between the second glass pane and the third glass pane,
wherein the third glass pane is secured between the first glass pane and the second glass pane by middle pane spacers positioned adjacent to the side seal, and/or
wherein the side seal comprises a first side seal arranged between the first glass pane and the third glass pane forming a first cavity part; and a second side seal arranged between the second glass pane and the third glass pane forming a second cavity part.

11. The roof or skylight window according to claim 10, wherein the third glass pane has a thickness of less than 2 mm.

12. The roof or skylight window according to claim 1, wherein the first glass pane is longer and/or wider than the second glass pane, wherein the side seal is arranged at an edge distance from peripheral parts of the first glass panes along one side of the first glass pane.

13. The roof or skylight window according to any of the claims 12, wherein the inner surface of at least the first glass pane further comprises a low emittance coating layer, wherein the low emittance coating layer:
comprises a silver layer, wherein the enamel layer is arranged on the inner surface of the first glass pane at a minimum separation distance of at least 1.5 mm from the low emittance coating layer comprising the silver layer, or
is absent of silver and wherein the low emittance coating layer comprises the enamel layer.

14. The roof or skylight window according to claim 1, wherein the side seal comprises a spacer bar comprising an outer shell with an inner filling material,
wherein the outer shell is a plastic outer shell or a metal outer shell, wherein the outer shell comprises openings providing gas access between the sealed cavity and the inner filling material, and
wherein the inner filling material is a desiccant material chosen from the group of:
Aerogel
Bentonite clay
Calcium chloride
Calcium oxide
Calcium sulfate (Drierite)
Molecular sieve
Silica gel.

15. The roof or skylight window according to claim 1, wherein the insulated glazing unit is adhered to a frame by a frame sealant material, wherein the frame sealant material is selected from the group of polysulfide adhesive, polyurethane adhesive, silicone adhesive, silane-terminated polyurethane (SPUR) adhesive, modified-silyl polymer (SMP) adhesive, or butyl adhesive.

16. The roof or skylight window according to claim 1, wherein a frame comprises a sash and a stationary frame part, wherein the insulated glazing unit is adhered to the sash and wherein the roof or skylight window can be opened by moving the sash relative to the stationary frame.

17. The roof or skylight window according to claim 1, wherein the roof or skylight window is a fixed or ventilating window, of a commercial building or a residential building, wherein the insulating unit is mounted in a frame such that the first glass pane is oriented towards an exterior and the second glass pane is oriented towards an interior of the commercial building or the residential building, wherein the roof or skylight window further comprises a cover adjacent to an outer side of the second glass pane, wherein the cover is selected from the group of blinds, rollers, shades, or curtains.

18. The roof or skylight window according to claim 1, wherein the inner surface of at least the first glass pane further comprises a low emittance coating layer, wherein the enamel layer is arranged on the inner surface of the first glass pane at a minimum separation distance of at least 1.5 mm from the low emittance coating layer.

19. A roof or skylight window comprising a frame and an insulated glazing unit, wherein the insulated glazing unit comprises:
a first glass pane and a second glass pane each having inner surfaces opposing each other, and
a side seal arranged between the first glass pane and the second glass pane creating a sealed cavity between the first and second glass panes;
wherein the first glass pane comprises an edge surface region overlapping the side seal along at least a first part of the side seal, wherein the edge surface region is a region at a peripheral edge of the first glass pane, wherein the edge surface region comprises an enamel layer comprising pigments wherein the pigments are metal and metal oxides comprising one or more of the metals selected from the list of: Aluminum; Antimony; Bismuth; Cobalt; Copper; Chrome; Iron; Manganese; Nickel; Titanium; Vanadium; Zinc; Zirconium; and wherein the pigments reflect at least 40% of solar radiation in a near infrared wavelength range between 700-2500 nm;

wherein the side seal is adhered to the inner surfaces of the first and second glass panes by a sealant material selected from the group of polyisobutylene, polysulfide, polyurethane, silicone, or mixtures including one or more from the group, wherein the enamel layer overlaps the sealant material, and/or extends over a larger area than the sealant material such that the sealant material is covered by the enamel layer.

* * * * *